US010320215B2

(12) United States Patent
Suetinov et al.

(10) Patent No.: US 10,320,215 B2
(45) Date of Patent: Jun. 11, 2019

(54) APPARATUS AND METHOD FOR INSTANT ON ABILITY

(71) Applicant: Intel Corporation, Santa Clara, CA (US)

(72) Inventors: Viacheslav Suetinov, Swindon (GB); Hans Joakim Bangs, Swindon (GB); Nicholas P. Cowley, Wroughton (GB); Mark S. Mudd, Wiltshire (GB); Ruchir Saraswat, Swindon (GB); Richard J. Goldman, Cirencester (GB)

(73) Assignee: Intel Corporation, Santa Clara, CA (US)

( * ) Notice: Subject to any disclaimer, the term of this patent is extended or adjusted under 35 U.S.C. 154(b) by 700 days.

(21) Appl. No.: 14/865,347

(22) Filed: Sep. 25, 2015

(65) Prior Publication Data
US 2017/0093174 A1 Mar. 30, 2017

(51) Int. Cl.
*H02J 7/00* (2006.01)
*H02J 7/04* (2006.01)

(52) U.S. Cl.
CPC ............ *H02J 7/007* (2013.01); *H02J 7/0052* (2013.01); *H02J 7/0068* (2013.01); *H02J 7/0073* (2013.01); *H02J 7/045* (2013.01)

(58) Field of Classification Search
CPC ........ H02J 7/007; H02J 7/0052; H02J 7/0068; H02J 7/0073; H02J 7/045; H02J 7/0059; H02J 7/006; H02J 7/0062; H02J 7/0063
See application file for complete search history.

(56) References Cited

U.S. PATENT DOCUMENTS 6,229,289 B1    5/2001  Piovaccari et al.
7,570,020 B1    8/2009  Kranzen et al.
                (Continued)

FOREIGN PATENT DOCUMENTS

JP    2010259293    11/2010
JP    2014030348    2/2014
WO    2008131334    10/2008

OTHER PUBLICATIONS

Day, Michael, "Understanding Low Drop Out (LDO) Regulators," Texas Instruments, 6 pages.
(Continued)

*Primary Examiner* — Nathaniel R Pelton
*Assistant Examiner* — Michael N Dibenedetto
(74) *Attorney, Agent, or Firm* — Trop, Pruner & Hu, P.C.

(57) ABSTRACT

In an embodiment, a system includes voltage sensing logic to determine a first source voltage $V_{first\ source}$ corresponding to a first source, and a controller to receive an indication of $V_{first\ source}$ from the voltage sensing logic. The controller is to, responsive to $V_{first\ source}>$a first output voltage ($V_1$), select a first source first regulator to input $V_{first\ source}$ and provide $V_1$; responsive to $V_{first\ source}>$a second output voltage ($V_2$), select a first source second voltage regulator that inputs $V_{first\ source}$, and provide $V_2$; responsive to $V_{first\ source}\leq V_1$, select a second source first voltage regulator that inputs a second source voltage $V_{second\ source}$ that corresponds to a second source and is substantially constant in time where $V_{second\ source}>V_1$, and provide $V_1$ independent of the first source first regulator and the first source second voltage regulator. Other embodiments are described and claimed.

20 Claims, 6 Drawing Sheets

(56) References Cited

U.S. PATENT DOCUMENTS

| 9,153,987 | B2* | 10/2015 | Mok | H02J 7/0052 |
|---|---|---|---|---|
| 2005/0195625 | A1 | 9/2005 | Onoue | |
| 2006/0022640 | A1* | 2/2006 | Frith | H02J 1/08 |
| | | | | 320/125 |
| 2007/0188139 | A1* | 8/2007 | Hussain | H02J 7/0073 |
| | | | | 320/128 |
| 2010/0270981 | A1 | 10/2010 | Motomiya | |
| 2012/0007547 | A1 | 1/2012 | Kim | |
| 2012/0217935 | A1 | 8/2012 | Hawini et al. | |

OTHER PUBLICATIONS

Dimension Engineering, "A beginner's guide to switching regulators," www.dimensionengineering.com/info/switching-regulators, 1 page.

International Searching Authority, "Notification of Transmittal of the International Search Report and the Written Opinion of the International Searching Authority," dated Dec. 8, 2016, in International application No. PCT/US2016/048339.

European Patent Office, Extended Search Report dated Mar. 15, 2019 in European Patent Application No. 16849253.6.

\* cited by examiner ly, switching
APPARATUS AND METHOD FOR INSTANT ON ABILITY

TECHNICAL FIELD

Embodiments pertain to instant on ability.

BACKGROUND

Products such as wearable products may have an "instant-on" feature that differentiates these products from other devices (e.g., tablets, mobile phones etc.,), where the device does not function until the battery has reached a minimum functional voltage for the device, which can be several minutes.

In the case of wearables, device functionality may be expected when connected to a battery charger (wired or wireless). With instant-on capability, regardless of a battery condition of a battery when connected to a charger source, the device will become operational substantially immediately, as perceived by a user. Operational, as used here, can include any level of performance, e.g., from complete use of all device features to use of a subset of the device features.

Instant on operation may be accomplished via a power multiplex switch. In normal operation, supply rails for the device are powered from the battery, which is disconnected from a charging source, e.g., a power source that is available to provide power as needed, and can be used to charge the battery. If the battery is unable to supply one of the rail voltages (due to partial discharge and corresponding low battery voltage), then all of the supply rails are to be supplied from another source, e.g., the charging source, which may result in inefficiencies in power usage and in area to be consumed by the power multiplex switch. That is, unless the battery voltage exceeds all of the instant-on voltages to be supplied, power to supply each rail voltage will come from the charging source. In order to supply one or more small instant-on voltages, a step-down of voltage (e.g., from charging source to each smaller instant-on voltage) may be needed for each instant-on voltage to be supplied, which may result in significant wasted power.

DETAILED DESCRIPTION

Figure 1:
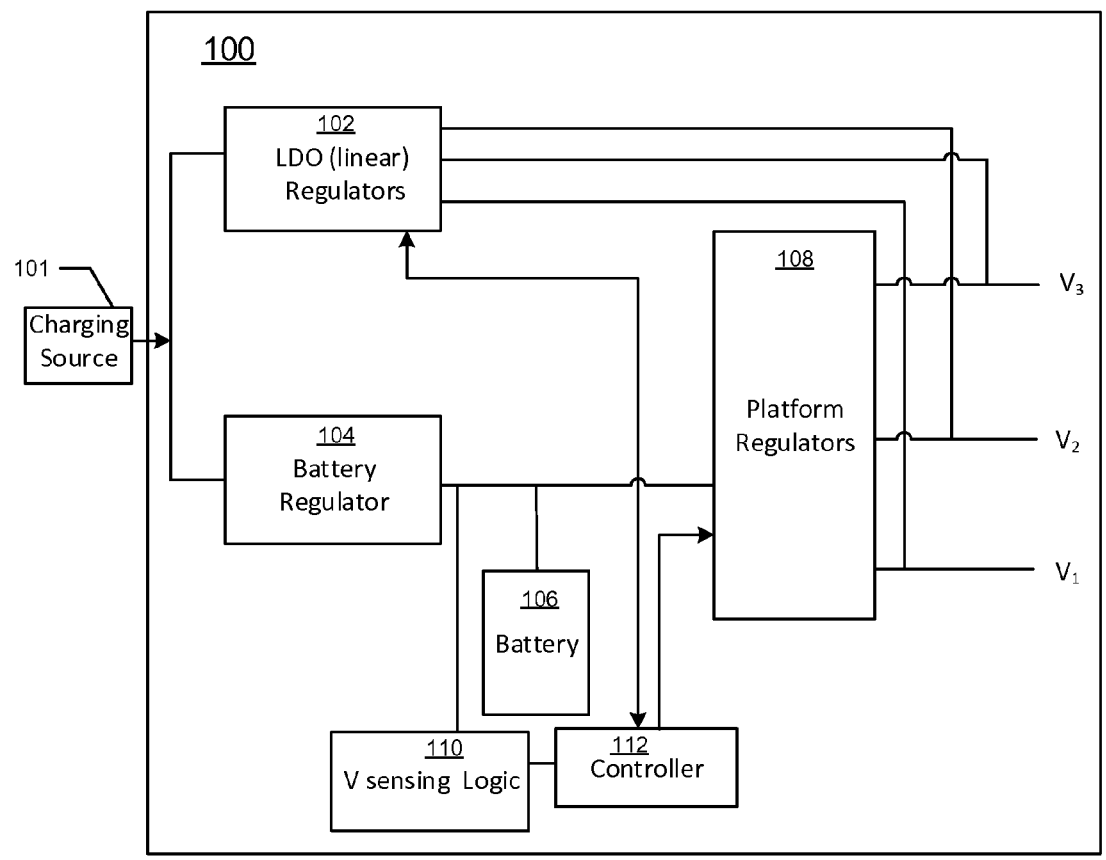
FIG. 1 is a block diagram of a system, according to an embodiment of the present invention.

Embodiments monitor a state of a battery and can supply rail voltages to, e.g., a wearable device with instant-on capability, from an auxiliary regulator such as a low dropout (LDO) regulator (e.g., linear regulator) in instances of low battery voltage. In embodiments, the rail voltages may be supplied directly from the auxiliary regulator during charging of the battery instead of, e.g., via a cascade arrangement that utilizes power bypass switches and in which an output of the auxiliary regulator is coupled to a set of platform regulators that provide instant-on voltage outputs. Embodiments eliminate power bypass switches that can occupy significant surface area on a chip and can waste significant power due to associated power loss, e.g., $I^2R$ losses. An embodiment includes a separate auxiliary regulator for each instant-on output voltage to be supplied, such as a low dropout (LDO) regulator, e.g., a linear regulator (an LDO regulator may also be referred to as an LDO herein). The auxiliary regulators (which may be situated on a system on a chip (SoC) that includes the platform regulators and other components) may provide the instant-on voltages while the battery is charging. As the battery charges to a battery voltage that is above a first instant-on voltage, a switching regulator powered by the battery can be used to supply the first instant-on voltage, and the corresponding auxiliary regulator can be disconnected or effectively disconnected (e.g., high impedance connection). Typically, switching regulators have a higher power efficiency than linear regulators, and so reduction in use of linear regulators may increase an overall power efficiency in operation of the device. Additionally, use of multiple LDOs, each designed to output a particular output voltage, may result in a savings in area occupied on a chip as compared with an arrangement that uses a single LDO to power all platform regulators (e.g., LDO cascaded to the platform regulators) while the battery is charging.

In embodiments, each auxiliary regulator can be logically OR-ed with an output of a corresponding battery powered regulator (e.g., a system-on-a-chip (SoC) regulator) so that either the auxiliary regulator or the corresponding battery powered SoC regulator can provide a particular SoC rail, (e.g., by enabling one of the auxiliary regulator and the battery powered regulator, and disabling the other). In an example, the auxiliary regulator may be an LDO regulator (linear regulator) and the battery powered regulator may be a switching regulator, with the switching regulator typically being of higher power efficiency than the corresponding linear regulator; hence, operating via the switching regulator when the battery is sufficiently charged may result in power savings.

In another embodiment the auxiliary regulator may be a switching regulator, so that when the battery voltage is less than or equal to a first instant-on voltage $V_1$, the output voltage $V_1$ is to be supplied by the auxiliary switching regulator powered by a substantially constant voltage (e.g., $V_{charger}$), and when the battery voltage is brought above the desired output voltage $V_1$, the battery-powered switching regulator may supply the output voltage $V_1$.

FIG. 1 is a block diagram of a system according to an embodiment of the present invention. System 100 includes LDO regulators 102, a battery regulator 104, a battery 106, platform regulators 108, voltage sensing logic 110 and a controller 112.

In operation, the voltage sensing logic 110 may monitor a voltage of the battery 106. The controller 112 may determine whether to provide output voltages $V_1$, $V_2$, and $V_3$ from the LDO regulators 102 powered by charging source 101, or from the platform regulators 108 that are powered by the battery 106. For example, the instant-on output voltages may be $V_3=3.3$ v., $V_2=1.8$ v. and $V_1=1.2$ volts. In an example, in an embodiment a battery that is fully charged has an output voltage of 4.2 volts.

In an embodiment, the platform regulators 108, e.g., one regulator for each of $V_1$, $V_2$, and $V_3$, are each of a switched mode type, e.g., buck switched mode regulator. In an embodiment, the LDO regulators 102 include a distinct linear regulator for each instant-on output voltage $V_1$, $V_2$, and $V_3$.

Assuming that $V_3>V_2>V_1$, if the battery outputs a voltage that is greater than $V_3$, the controller 112 determines that the platform regulators 108 are to output the instant-on voltages $V_1$, $V_2$, $V_3$, with each instant-on voltage to be supplied by a distinct switching regulator within the platform regulators 108, each switching regulator powered by the battery 106, e.g., to receive input voltage $V_{batt}$ from the battery 106.

If the battery voltage $V_{batt}$ of the battery 106 is less than $V_3$ and $V_2$ and greater than $V_1$, as sensed by the voltage sensing logic 110, the controller 112 may determine that the LDO regulators 102 are to provide $V_3$ and $V_2$ (e.g., a distinct linear regulator for each of $V_3$ and $V_2$) while $V_1$ is to be output from one of the switching regulators within the platform regulators 108 that receives input power from the battery 106.

The battery 106 may be charged by the battery regulator 104, and when the battery voltage exceeds $V_2$, then the controller 112 may determine that the platform regulators 108 are to provide $V_2$ and $V_1$, e.g., instead of $V_2$ being provided by the LDO regulators 102, while one of the LDO regulators 102 continues to provide $V_3$.

If the battery 106 has an output voltage less than $V_1$, $V_2$, and $V_3$, the controller 112 may determine that the LDO regulators 102 are to provide each of $V_1$, $V_2$, and $V_3$. The battery regulator 104 may attempt to charge the battery 106 and if the battery voltage rises above $V_1$, the controller 112 may determine to provide $V_1$ from the platform regulators 108. In an embodiment, if the battery does not accept a charge (e.g., the battery voltage does not rise), the controller 112 may flag a warning to a user. Thus, one or more the charging source-powered LDO regulators 102, and/or one or more of the battery-powered platform regulators 108 can provide $V_1$, $V_2$, and $V_3$, as determined by the controller 112 that can enable one or more of the regulators of the platform regulators 108 and disable one or more of the LDO regulators 102, or vice versa.

If the battery voltage rises above $V_3$, e.g., due to charging by the battery regulator (also battery charging regulator herein) 104, the controller 112 may determine that the platform regulators 108 (e.g., that receive input voltage from the battery 106) are to supply each of $V_1$, $V_2$, $V_3$, and the LDO regulators 102 are disabled from supplying $V_1$, $V_2$, and $V_3$.

Note that in embodiments, any rechargeable source, such as a supercapacitor, can be used in place of a battery to provide voltage to the platform regulators. In embodiments described herein, without loss of generality the battery may be replaced by a rechargeable source that is capable of storing power and providing stored power to one or more regulators, e.g., switching regulators.

A typical wearable device may consume 3.3 v. @ 100 mA, 1.8 v. @ 300 mA, 1.2 v. @ 100 mA. In systems that use a multiplex switch (approx. 1 mm²) and a single instant-on LDO regulator (approx. 0.5 mm²) to provide 500 mA to the platform voltage regulators, a total area occupied by the multiplex switch and LDO may be approximately 1.5 mm². In contrast, embodiments have no multiplex switches and employ separate LDOs for each voltage output. A total area occupied by three LDOs is approx. 0.35 mm², which is a reduction in area of 1.15 mm², or about 75% reduction from the occupied area of 1.5 mm² for a system that uses a multiplex switch and a single LDO. Thus, embodiments, such as shown in FIG. 1, may occupy an area (e.g., of a system on a chip (SoC)) that is significantly smaller than an arrangement that uses a multiplex switch and a single LDO. An additional benefit may be that in an embodiment such as that of FIG. 1, an associated electrical leakage may also be less than that of the arrangement with the multiplex switch and single LDO.

Figure 2:
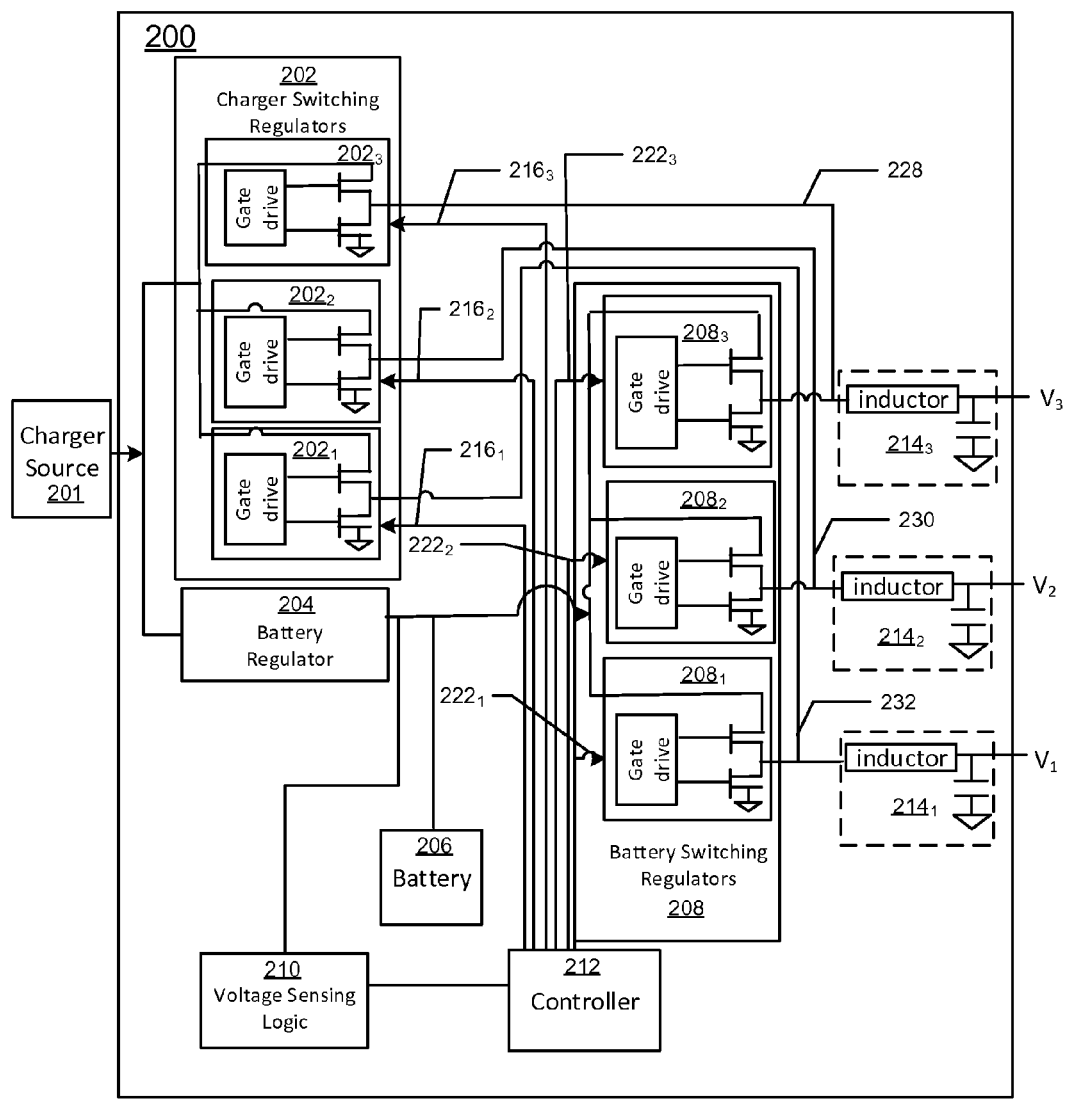
FIG. 2 is a block diagram of a system, according to another embodiment of the present invention.

FIG. 2 is a block diagram of a system according to another embodiment of the present invention. System 200 includes charger-powered switching regulators 202 including switching regulators $202_1$, $202_2$, and $202_3$, battery regulator (e.g., battery charging regulator) 204, battery 206, battery switching regulators 208 including switching regulators $208_1$, $208_2$, and $208_3$, voltage sensing logic 210, controller 212, and low pass filters $214_1$-$214_3$.

In operation, the system 200 is to provide instant-on voltages $V_1$, $V_2$, and $V_3$, where $V_1<V_2$, $<V_3$. The voltage sensing logic 210 measures a battery voltage $V_{batt}$ of the battery 206. The controller 212 accesses a measurement of $V_{batt}$ and determines whether the battery 206 is to be a source for one or more of $V_1$, $V_2$, and $V_3$. For example, when $V_{batt}$ exceeds $V_1$, the battery 206 is to be the source for output voltage $V_1$.

Switching regulator $208_1$ is to be used when the battery 206 is the source for the source for $V_1$, and the controller 212 is to activate switching regulator $208_1$ via path 222. When $V_{batt} \leq V_1$, the charger source 201 is to be used as the source for $V_1$, and the controller activates switching regulator $202_1$ via path $216_1$, to supply $V_1$. The controller 212 is to determine, based on $V_{batt}$, which of the two sources (the battery 206 or the charger source 201) is to serve as the source for each of $V_1$, $V_2$, and $V_3$. For each instance of the charger source 201 used as the source to supply $V_i$ (where i is 1, 2, or 3), the corresponding switching regulator $202_i$ is selected by the controller 212 (via one of paths $216_1$, $216_2$, $216_3$) to provide voltage to the corresponding low pass filter $214_i$. For each instance of the battery 206 used as the power source to supply $V_i$, the corresponding switching regulator $208_i$ is selected by the controller (via one of the paths or $222_1$, $222_2$, $222_3$) to provide voltage to the corresponding low pass filter $214_i$.

Thus, whether the source is the charger source 201 or the battery 206, a switching regulator is employed to supply the output voltage. Switching regulators (also switched regulators herein) tend to have a higher efficiency (e.g., higher power efficiency that results in less wasted power) than linear regulators and therefore the configuration of FIG. 2 may lead to greater efficiency than, e.g., in configurations that use linear regulators (e.g., LDO regulators) to provide instant-on voltage when the battery voltage does not exceed the intended output voltage (e.g., FIG. 1). Further, as shown in FIG. 2, a single low pass filter ($214_i$) can be used to supply a particular output voltage $V_x$ whether the source is the charger source 201 or the battery 206. Use of a single low pass filter for two switching regulators (e.g., switching regulator $202_1$ and switching regulator $208_1$) can result in a savings of space and cost as compared with use of a corresponding low pass filter for each switching regulator. Note that in other embodiments, there may be N output voltages, where $N \geq 2$. For example, N may be 3, 4, 5, etc.

Figure 3:
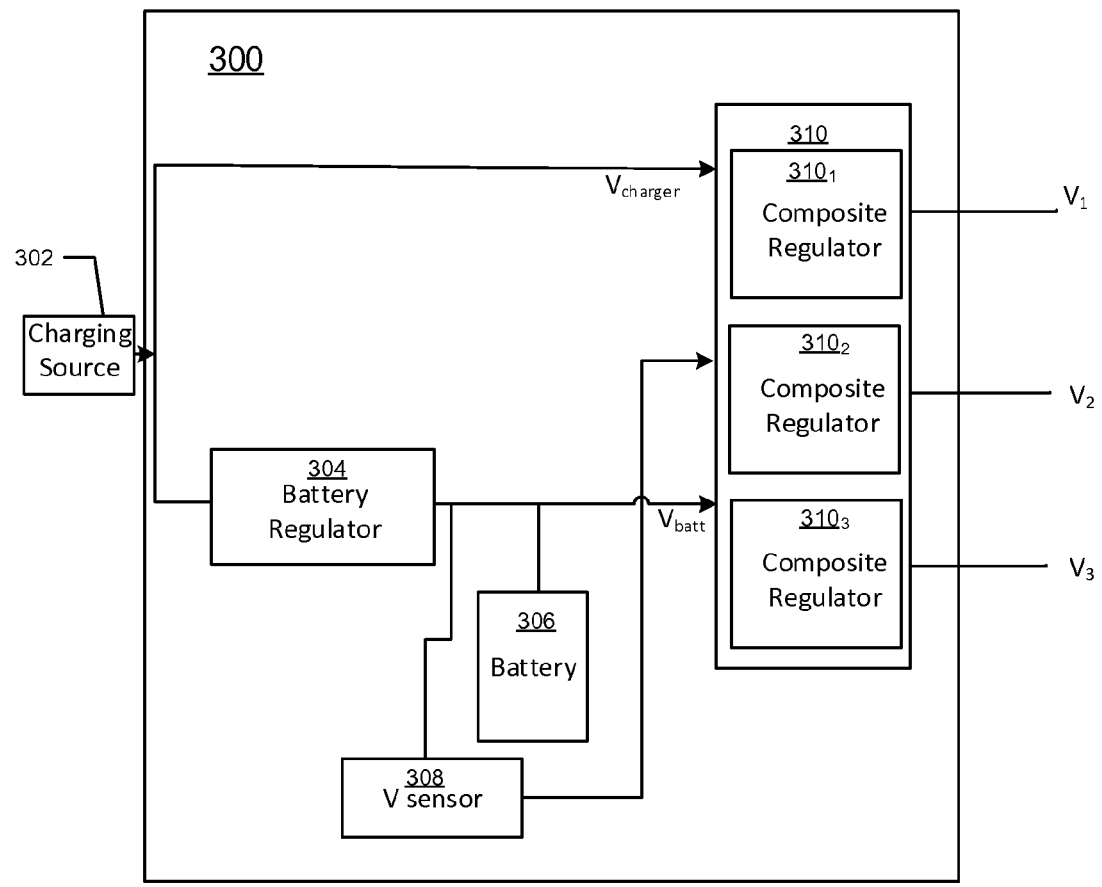
FIG. 3 is a block diagram of system, according to another embodiment of the present invention.

FIG. 3 is a block diagram of a system, according to another embodiment of the present invention. System 300 includes platform switching regulators 310 that include composite regulators $310_1$, $310_2$, $310_3$, a battery 306, and voltage sensing logic 308. Each composite regulator $310_i$ may have two modes—a battery-powered mode to supply a corresponding instant-on voltage $V_i$ (i=1, 2, or 3), and a charger source-powered mode to supply the corresponding $V_i$. Regulators $310_1$, $310_2$, and $310_3$ may vary somewhat in design, as shown in FIGS. 4-5.

In operation, each regulator $310_i$ may include a corresponding controller (not shown) to determine, based on a battery voltage $V_{batt}$ as provided by battery voltage sensing logic 308, whether $V_{batt}$ exceeds the corresponding $V_i$ to be supplied by the regulator $310_i$, and if so, to configure the composite regulator $310_i$ so that the composite regulator $310_i$ is powered by $V_{batt}$. If $V_{batt} \leq V_i$, the internal controller of the composite regulator $310_i$ may configure the composite regulator $310_i$ to be powered by $V_{charger}$, e.g., from a charging source 302. Each composite regulator $310_i$ may be a switching regulator, which has greater efficiency than, e.g. a linear regulator, and each composite regulator $310_i$ operates as a switching regulator in both battery-powered mode and charging source-powered mode. Battery regulator 304 provides power to recharge battery 306 responsive to $V_{batt}$ having a value less than that of a fully charged battery.

Figure 4:
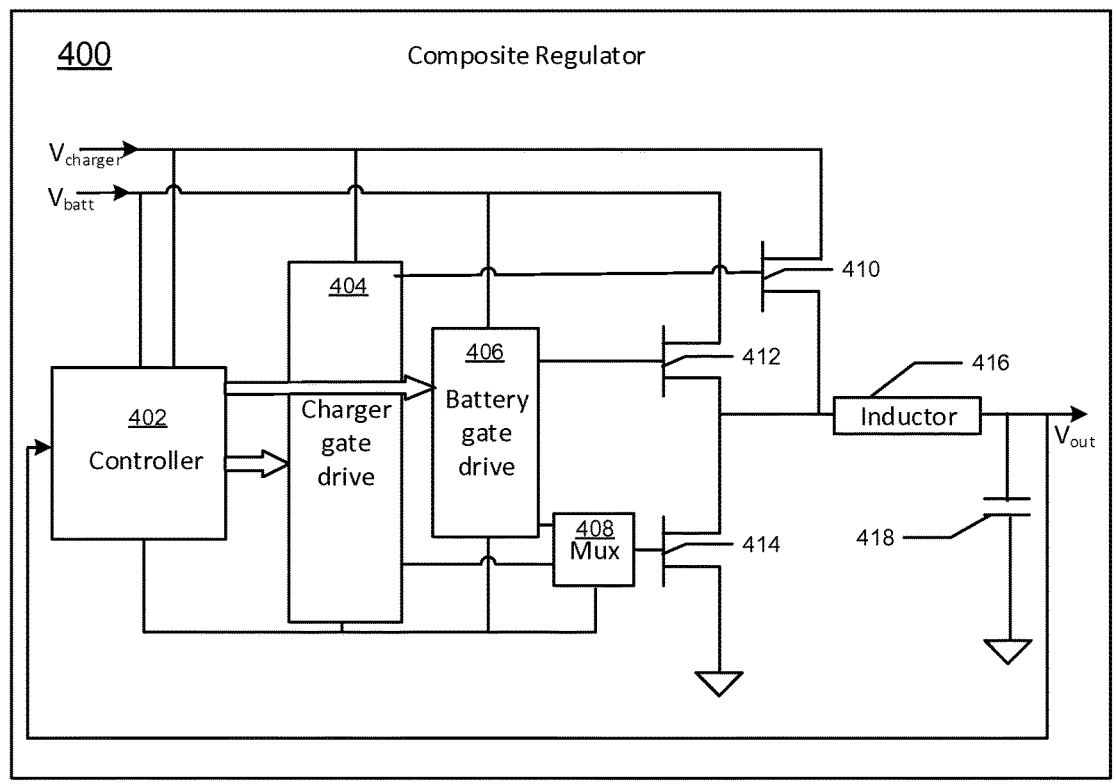
FIG. 4 is a block diagram of a portion of a system, according to an embodiment of the present invention.
Figure 5:
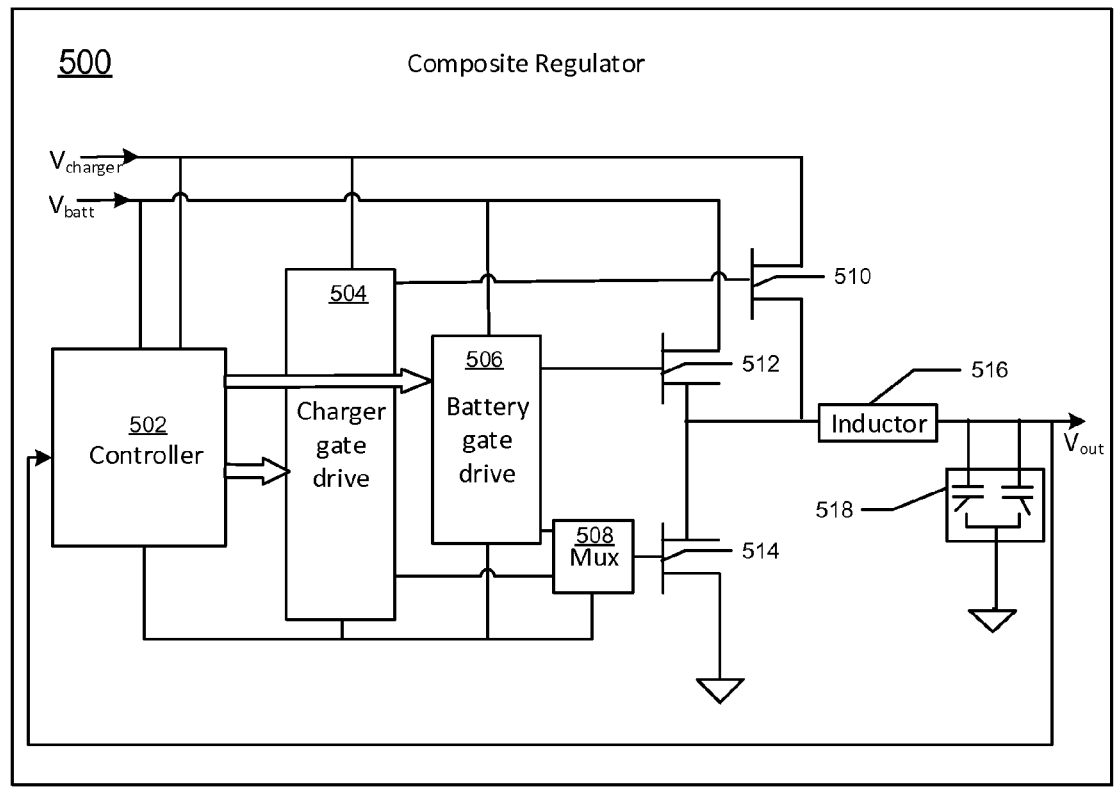
FIG. 5 is a block diagram of a portion of a system, according to another embodiment of the present invention.

FIG. 4 is a block diagram of a system, according to an embodiment of the present invention. System 400 is a switching regulator that includes a controller 402, a gate drive 404, a gate drive 406, a multiplexer 408, field effect transistors (FETs) 410, 412, and 414, an inductor 416 and a capacitor 418, and may be employed as a composite regulator, e.g., any one of composite regulators $310_1$, $310_2$, and $310_3$ of the system 300 of FIG. 3.

In system 400, independent upper switching FETs 410 and 412 are deployed, one for each of the two modes of operation. A control input to FET 410 is fed from the charger gate drive 404. A control input to FET 412 is fed from the battery gate drive 406. A single lower FET 414 is used as part of the switching regulator whether powered by $V_{charger}$ (e.g., from a battery charger, $V_{charger}$ is substantially fixed voltage) or by $V_{batt}$ (voltage supplied by a battery, where $V_{batt}$ may change over time).

The controller 402 for the composite regulator 400 is shown with inputs from both the charger source $V_{charger}$ and the battery $V_{batt}$.

In operation, when $V_{batt} > V_{out}$, the controller 402 selects the battery gate driver 406, and $V_{batt}$ is to supply input voltage to the composite regulator 400. An associated power train that includes battery gate drive 406, FET 412, multiplexer 408, and FET 414, is active, e.g., during a first portion of a cycle current travels through FET 412 to inductor 416 that with capacitor 418 forms a low pass filter, and during a second portion of the cycle current flows from inductor 416 through FET 414, while FET 412 is disabled throughout the cycle. Another power train associated with the charger (e.g., including charger gate drive 404, multiplexer 408, FET 414, and FET 410) is disabled (e.g., to high impedance) while FET 412 is active for a portion of the cycle.

When $V_{batt} \leq V_{out}$, the controller 402 selects the charger gate drive 404 to control multiplexer 408, FET 414, and FET 410, and $V_{charger}$ is to supply the input voltage to the composite regulator 400. The controller 402 activates the charger gate drive 404, and the power trains are oppositely configured, e.g., the power train of the charger (e.g., via FET 410) is activated. During a first portion of a cycle current travels through FET 410 to inductor 416, and during a second portion of the cycle current flows from the inductor 416 through FET 414. FET 412 is disabled (e.g., to high impedance).

Embodiment 400 is advantageous in that the same regulator is used whether the source voltage is $V_{batt}$ or the source voltage $V_{charger}$ with different components activated for each mode. The switching regulator 400 has a first active configuration when $V_{batt}$ supplies power, and a second active configuration when $V_{charger}$ supplies power. Whether $V_{batt}$ or $V_{charger}$ supplies power, use of the switching regulator, rather than a linear regulator can result in an efficiency improvement over a system that uses one or more linear regulators.

In some embodiments, power trains may be formed from two or more stacked devices, where the number of devices varies with the FET position in the power stage. FIG. 5 is a block diagram of a system, according to another embodiment of the present invention. System 500 is a switched mode regulator that includes a controller 502, a gate drive 504, a gate drive 506, a multiplexer 508, field effect transistors (FETs) 510, 512, and 514, an inductor 516, and a programmable capacitive array 518 and may be utilized as a composite regulator, e.g., $510_1$, $510_2$, and $510_3$ of the system 500 of FIG. 5. Operation of composite regulator 500 is similar to the operation of composite regulator 400 of FIG. 4. Programmable capacitive array 518 may accommodate various ripple current requirements. For example, a variation in ripple voltage with load currents can be accommodated by selecting a capacitance in the capacitive array 518.

Note that other embodiments may use one or more switching regulators that utilize capacitors to achieve a switching function instead of use of inductors to achieve the switching function. Use of capacitor-based switching regulators is typically similar in functionality to use of inductor-based switching regulators.

Figure 6:
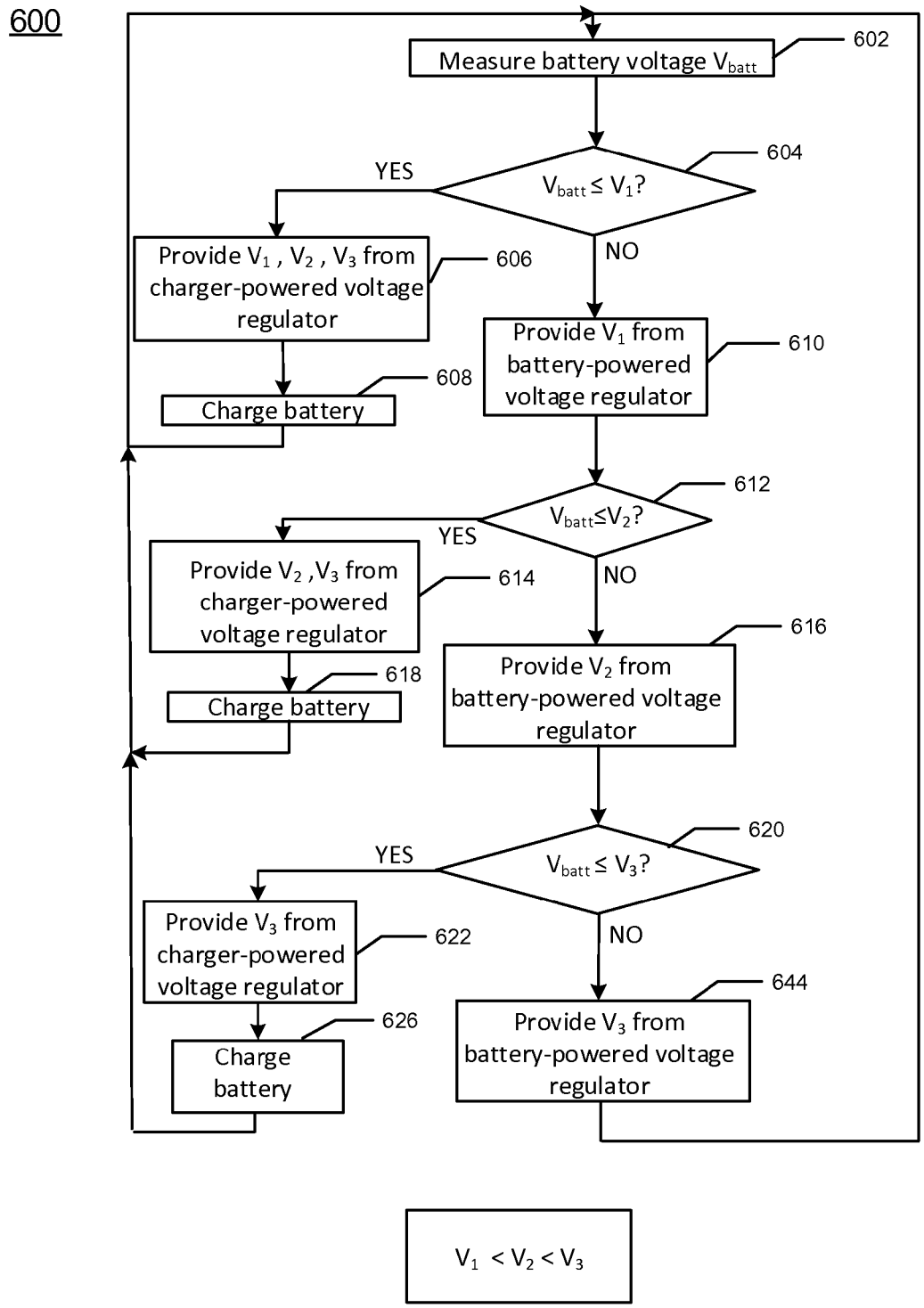
FIG. 6 is a flow diagram of a method, according to an embodiment of the present invention.

FIG. 6 is a flow diagram of a method, according to an embodiment of the present invention. In method 600, $V_1$, $V_2$, and $V_3$ are output voltages (e.g., instant-on voltages) to be provided, and $V_1 < V_2 < V_3$. Beginning at block 602, battery voltage $V_{batt}$ of a battery (e.g., to provide power to a device with instant-on capability) is measured. Continuing to decision diamond 604, if $V_{batt} \leq V_1$, then advancing to block 606, $V_1$, $V_2$, and $V_3$ are be provided by charger-powered regulators whose input is a substantially constant voltage source. Moving on to block 608, the battery undergoes charging. The method returns to decision diamond 602.

If $V_{batt} > V_1$ proceeding to block 610 $V_1$ is to be provided by a battery-powered regulator, e.g., input voltage from the battery. Continuing to decision diamond 612, if $V_{batt} \leq V_2$ (where $V_2$ is larger than $V_1$) advancing to block 614, charger-powered regulators are to provide voltages $V_2$ and $V_3$. Advancing to block 618, the battery is being charged, and the method returns to block 602 to measure the battery voltage $V_{batt}$.

If, at decision diamond 612, the battery voltage is larger than $V_2$, moving to block 616 $V_2$ is to be provided by a battery-powered regulator, which may be, e.g., a switching regulator. Proceeding to decision diamond 620, if the battery voltage $V_{batt} \leq V_3$, continuing to block 622 $V_3$ is to be provided by a charger-powered regulator, and continuing to block 626, the battery is to be charged. The method returns to block 602 to measure the battery voltage $V_{batt}$.

If, at decision diamond 620, it is determined that the battery voltage is larger than $V_3$, advancing to block 644 $V_3$ is to be provided by a battery-powered regulator. At block 644, all three voltages $V_1$, $V_2$, and $V_3$ are to be provided by battery-powered regulators. The method returns to block 602, where the battery voltage is monitored. If the battery voltage should fall below any of $V_1$, $V_2$, or $V_3$, then one or more of the output voltages will be provided by a corresponding charger-powered regulator, and the battery undergoes charging by a battery charger.

Additional embodiments are described below.

A first embodiment is a system that includes: voltage sensing logic to determine a first source voltage $V_{first\ source}$ that corresponds to a first source; and a controller to receive an indication of $V_{first\ source}$ from the voltage sensing logic, and further to: responsive to $V_{first\ source}>$a first output voltage ($V_1$), select a first source first regulator to input $V_{first\ source}$ and to provide $V_1$; responsive to $V_{first\ source}>$a second output voltage ($V_2$), select a first source second voltage regulator to input $V_{first\ source}$ and to provide $V_2$; and responsive to $V_{first\ source} \leq V_1$, select a second source first voltage regulator to input a second source voltage $V_{second\ source}$ that corresponds to a second source, where $V_{second\ source}$ is substantially constant in time and $V_{second\ source}>V_1$, and to provide $V_1$ independent of the first source first regulator and of the first source second voltage regulator.

A second embodiment includes elements of the first embodiment, where the first source includes a rechargeable source.

A $3^{rd}$ embodiment includes elements of the $1^{st}$ embodiment, where responsive to $V_{first\ source} \leq V_2$ the controller is to select a second source second regulator to input $V_{second\ source}$, wherein $V_{second\ source}>V_2$, to provide $V_2$, and to deactivate the first source second voltage regulator.

A $4^{th}$ embodiment includes elements of the $1^{st}$ embodiment, where $V_{second\ source}>$an $N^{th}$ output voltage ($V_N$) and $V_N>V_2$, wherein $N>2$ and where responsive to $V_{first\ source} \leq V_N$ the controller is to select a second source $N^{th}$ voltage regulator to input $V_{second\ source}$ and to provide $V_N$.

A $5^{th}$ embodiment includes elements of the $4^{th}$ embodiment, further including responsive to $V_{first\ source}>V_N$ the controller is to select a first source $N^{th}$ voltage regulator to input $V_{first\ source}$ and to output $V_N$ and to deactivate the second source $N^{th}$ voltage regulator.

A $6^{th}$ embodiment includes elements of the $1^{st}$ embodiment, further including a charging source, where responsive to $V_{first\ source} \leq V_1$, the charging source is to supply power to the first source, and where after power is provided to the first source and responsive to an increase in $V_{first\ source}$ to greater than $V_1$, the controller is to select the first source first voltage regulator to output $V_1$ and to deactivate the second source first regulator, and responsive to an increase in $V_{first\ source}$ to greater than $V_2$, the controller is to select the first source second voltage regulator to provide $V_2$.

A $7^{th}$ embodiment includes elements of the $6^{th}$ embodiment, where responsive to $V_{first\ source} \leq V_N$ wherein $V_N$ is an $N^{th}$ output voltage, $N \geq 2$, and $V_N < V_{max}$ where $V_{max}$ is a maximum voltage of the first source, the controller is to select a second source $N^{th}$ voltage regulator to input $V_{second\ source}$ and to provide $V_N$ and the controller is to deactivate a first source $N^{th}$ voltage regulator, and the charging source is to supply power to the first source, and where responsive to an increase in $V_{first\ source}$ to greater than $V_N$, the controller is to select the first source $N^{th}$ voltage regulator to provide $V_N$ and to deactivate the second source $N^{th}$ voltage regulator.

An $8^{th}$ embodiment includes elements of the $7^{th}$ embodiment, where the first source $N^{th}$ voltage regulator and the second source $N^{th}$ voltage regulator are included in an $N^{th}$ composite regulator that is a switching regulator, where in a first mode the $N^{th}$ composite regulator is to input $V_{first\ source}$ and to provide $V_N$, and in a second mode the composite regulator is to input $V_{second\ source}$ and to provide $V_N$.

A $9^{th}$ embodiment includes elements of the $1^{st}$ embodiment, where the second source first voltage regulator includes a switching regulator to input $V_{second\ source}$ and to provide $V_1$.

A $10^{th}$ embodiment includes elements of the $1^{st}$ embodiment, where the first source first voltage regulator comprises a first switching regulator to input $V_{first\ source}$ and to provide $V_1$ responsive to $V_{first\ source}>V_1$.

An $11^{th}$ embodiment includes elements of any one of embodiments 1-10, where the first source second voltage regulator comprises a second switching regulator to, responsive to $V_{first\ source}>V_2$, input $V_{first\ source}$ and to provide $V_2$.

A $12^{th}$ embodiment is method that includes: receiving, by control circuitry, an indication of a first source voltage $V_{first\ source}$ of a first source; selecting, by the control circuitry, a first source first regulator to input $V_{first\ source}$ and supply a first voltage ($V_1$) responsive to $V_{first\ source}>V_1$, and selecting by the controller responsive to $V_{first\ source} \leq V_1$ a second source first voltage regulator to input from a second source a voltage $V_{second\ source}>V_1$ wherein $V_{second\ source}$ is substantially constant, and to supply $V_1$ independent of the first source first voltage regulator; and selecting, by the control circuitry, a first source second voltage regulator that is to input $V_{first\ source}$ and supply a second voltage ($V_2$) responsive to $V_{first\ source}>V_2$, where $V_2>V_1$ and selecting by the control circuitry responsive to $V_{first\ source} \leq V_2$ a second source second voltage regulator that is to input $V_{second\ source}$ and is to supply $V_2$ independent of the first source first voltage regulator and of the first source second voltage regulator, wherein $V_{second\ source}>V_2$.

A $13^{th}$ embodiment includes elements of the $12^{th}$ embodiment, where the first source includes a rechargeable source, further including responsive to $V_{first\ source}<V_1$ determining to charge the first source.

A $14^{th}$ embodiment includes elements of the $12^{th}$ embodiment, further including responsive $V_{first\ source}$ being greater than an $N^{th}$ voltage ($V_N$), where $V_N>V_2$, selecting by the control circuitry a first source $N^{th}$ voltage regulator that is to input $V_{first\ source}$ and is to supply $V_N$, and responsive to $V_{first\ source}<V_N$ selecting a second source $N^{th}$ voltage regulator to input $V_{second\ source}$ and to supply $V_N$ independent of the first source first voltage regulator, the first source second voltage regulator, and the first source $N^{th}$ voltage regulator, wherein $V_{second\ source}>V_N$.

A $15^{th}$ embodiment includes elements of the $14^{th}$ embodiment, where the first source $N^{th}$ voltage regulator includes a switching regulator.

A $16^{th}$ embodiment includes elements of the $14^{th}$ embodiment, where the second source $N^{th}$ voltage regulator includes a switching regulator.

A $17^{th}$ The embodiment includes elements of the $12^{th}$ embodiment, where the second source first voltage regulator includes a linear voltage regulator.

An $18^{th}$ embodiment includes elements of the $12^{th}$ embodiment, where the first source first voltage regulator includes a switching regulator.

A $19^{th}$ embodiment is an apparatus including means for performing the method of any one of embodiments 14-18.

A $20^{th}$ embodiment is a system including: a first source regulator module that includes a first source first voltage regulator means for inputting a first source voltage $V_{first\ source}$ from a first source, and for supplying a first output voltage ($V_1$) responsive to selection of the first source first voltage regulator by a controller, and further includes a first source second voltage regulator means for inputting $V_{first\ source}$ and for supplying a second output voltage ($V_2$) responsive to selection of the first source second voltage regulator means by the controller, wherein $V_2>V_1$; a second source voltage regulator module that includes a second source first voltage regulator means for inputting a second source voltage $V_{second\ source}$ that is substantially constant from a second source that is distinct from the first source and wherein $V_{second\ source}>V_1$ and $V_{second\ source}>V_2$, and responsive to selection of the second source first voltage regulator means by the controller, for supplying the first output voltage $V_1$ independent of the first source first voltage regulator means and independent of the first source second voltage regulator means, and a second source second voltage regulator means for inputting $V_{second\ source}$ and responsive to selection of the second source second voltage regulator by the controller for supplying $V_2$ independent of the first source first voltage regulator means and independent of the first source second voltage regulator means; and the controller to monitor $V_{first\ source}$ and to select the first source first voltage regulator means to supply $V_1$ responsive to $V_{first\ source}>V_1$ otherwise to select the second source first voltage regulator means to supply $V_1$, the controller further to select the first source second voltage regulator means to supply $V_2$ responsive to $V_{first\ source}>V_2$ otherwise to select the second source second voltage regulator means to supply $V_2$.

A $21^{st}$ embodiment includes elements of the $20^{th}$ embodiment, where the first source first voltage regulator means includes a first switching regulator to supply $V_1$ responsive to selection by the controller of the first source first voltage regulator.

A $22^{nd}$ embodiment includes elements of the $20^{th}$ embodiment, where the second source first voltage regulator means includes a first linear regulator to supply $V_1$ responsive to selection by the controller of the second source first voltage regulator.

A $23^{rd}$ embodiment includes elements of any one of embodiments 20-22, where the first source regulator module includes a first source $N^{th}$ voltage regulator means and the second source regulator module includes a second source $N^{th}$ voltage regulator means, where $N>2$ and $V_N$ is an $N^{th}$ output voltage, where responsive to $V_{first\ source} \leq V_N$ the controller is to select the second source $N^{th}$ voltage regulator means to input $V_{second\ source}$ and to supply $V_N$, and responsive to $V_{first\ source}>V_N$ the controller is to select the first source $N^{th}$ voltage regulator means to input $V_{first\ source}$ and to supply $V_N$.

A $24^{th}$ embodiment includes elements of the $20^{th}$ embodiment, further including a charging means, where responsive to $V_{first\ source} \leq V_1$, the charging means is for supplying power to the first source, and where after power is provided to the first source and responsive to an increase in $V_{first\ source}$ to greater than $V_1$, the controller is to select the first source first voltage regulator means to output $V_1$ and to deactivate the second source first regulator means, and responsive to an increase in $V_{first\ source}$ to greater than $V_2$, the controller is to select the first source second voltage regulator means to provide $V_2$ and to deactivate the second source second regulator means.

A $25^{th}$ embodiment includes elements of the $24^{th}$ embodiment, where responsive to $V_{first\ source} \leq V_N$ wherein $V_N$ is an $N^{th}$ output voltage, $N>2$, and $V_N<V_{max}$ wherein $V_{max}$ is a maximum voltage of the first source, the controller is to select a second source $N^{th}$ voltage regulator to input $V_{second\ source}$ and to provide $V_N$ and the controller is to deactivate a first source $N^{th}$ voltage regulator, and the charging means is to supply power to the first source, and where responsive to an increase in $V_{first\ source}$ to greater than $V_N$, the controller is to select the first source $N^{th}$ voltage regulator to provide $V_N$ and to deactivate the second source $N^{th}$ voltage regulator.

A $26^{th}$ embodiment is a machine-readable medium having stored thereon instructions, which if performed by a machine cause the machine to perform a method including: receiving, by control circuitry, an indication of a first source voltage $V_{first\ source}$ of a first source; selecting, by the control circuitry, a first source first regulator to input $V_{first\ source}$ and supply a first voltage ($V_1$) responsive to $V_{first\ source}>V_1$, and selecting by the controller responsive to $V_{first\ source} \leq V_1$ a second source first voltage regulator to input from a second source a voltage $V_{second\ source}>V_1$ where $V_{second\ source}$ is substantially constant, and to supply $V_1$ independent of the first source first voltage regulator; and selecting, by the control circuitry, a first source second voltage regulator that is to input $V_{first\ source}$ and supply a second voltage ($V_2$) responsive to $V_{first\ source}>V_2$, wherein $V_2>V_1$ and selecting by the control circuitry responsive to $V_{first\ source} \leq V_2$ a second source second voltage regulator that is to input $V_{second\ source}$ and is to supply $V_2$ independent of the first source first voltage regulator and of the first source second voltage regulator, where $V_{second\ source}>V_2$.

A $27^{th}$ embodiment includes elements of the $26^{th}$ embodiment, where the first source includes a rechargeable source, further including responsive to $V_{first\ source}<V_1$ determining to charge the first source.

A $28^{th}$ embodiment includes elements of the $26^{th}$ embodiment, where the method further includes responsive $V_{first\ source}$ being greater than an $N^{th}$ voltage ($V_N$), wherein $V_N>V_2$, selecting by the control circuitry a first source $N^{th}$ voltage regulator that is to input $V_{first\ source}$ and is to supply $V_N$, and responsive to $V_{first\ source}<V_N$ selecting a second source Nth voltage regulator to input $V_{second\ source}$ and to supply $V_N$ independent of the first source first voltage regulator, the first source second voltage regulator, and the first source $N^{th}$ voltage regulator, where $V_{second\ source}>V_N$.

A $29^{th}$ embodiment includes elements of the $26^{th}$ embodiment, where the second source first voltage regulator includes a linear voltage regulator.

A $30^{th}$ embodiment includes elements of any one of embodiments 26-29, where the first source first voltage regulator comprises a switching regulator.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   voltage sensing logic to determine a first source voltage $V_{first\ source}$ that corresponds to a first source; and
   a controller to receive an indication of $V_{first\ source}$ from the voltage sensing logic, and further to:
   responsive to $V_{first\ source}>$a first output voltage ($V_1$), select a first source first voltage regulator to input $V_{first\ source}$ and to provide $V_1$;
   responsive to $V_{first\ source}>$a second output voltage ($V_2$), select a first source second voltage regulator to input $V_{first\ source}$ and to provide $V_2$; and
   responsive to $V_{first\ source}\leq V_1$, select a second source first voltage regulator to input a second source voltage $V_{second\ source}$ that corresponds to a second source, wherein $V_{second\ source}$ is substantially constant in time and $V_{second\ source}>V_1$, and to provide $V_1$ independent of the first source first voltage regulator and of the first source second voltage regulator.

2. The system of claim 1, wherein the first source includes a rechargeable source.

3. The system of claim 1, wherein responsive to $V_{first\ source}\leq V_2$ the controller is to select a second source second voltage regulator to input $V_{second\ source}$, wherein $V_{second\ source}>V_2$, to provide $V_2$, and to deactivate the first source second voltage regulator.

4. The system of claim 1, wherein $V_{second\ source}>$an $N^{th}$ output voltage ($V_N$) and $V_N>V_2$, wherein $N>2$ and wherein responsive to $V_{first\ source}\leq V_N$ the controller is to select a second source $N^{th}$ voltage regulator to input $V_{second\ source}$ and to provide $V_N$.

5. The system of claim 4, further comprising responsive to $V_{first\ source}>V_N$ the controller is to select a first source $N^{th}$ voltage regulator to input $V_{first\ source}$ and to output $V_N$ and to deactivate the second source $N^{th}$ voltage regulator.

6. The system of claim 1, further comprising a charging source, wherein responsive to $V_{first\ source}\leq V_1$, the charging source is to supply power to the first source, and wherein after power is provided to the first source and responsive to an increase in $V_{first\ source}$ to greater than $V_1$, the controller is to select the first source first voltage regulator to output $V_1$ and to deactivate the second source first regulator.

7. The system of claim 6, wherein responsive to $V_{first\ source}\leq V_N$ wherein $V_N$ is an $N^{th}$ output voltage, $N\geq 2$, and $V_N<V_{max}$ wherein $V_{max}$ is a maximum voltage of the first source, the controller is to select a second source $N^{th}$ voltage regulator to input $V_{second\ source}$ and to provide $V_N$ and the controller is to deactivate a first source $N^{th}$ voltage regulator, and the charging source is to supply power to the first source, and wherein responsive to an increase in $V_{first\ source}$ to greater than $V_N$, the controller is to select the first source $N^{th}$ voltage regulator to input $V_{first\ source}$ and provide $V_N$ and the controller is further to deactivate the second source $N^{th}$ voltage regulator.

8. The system of claim 7, wherein the first source $N^{th}$ voltage regulator and the second source $N^{th}$ voltage regulator are included in an $N^{th}$ composite regulator that is a switching regulator, wherein in a first mode the $N^{th}$ composite regulator is to input $V_{first\ source}$ and to provide $V_N$, and in a second mode the composite regulator is to input $V_{second\ source}$ and to provide $V_N$.

9. The system of claim 1, wherein the second source first voltage regulator includes a switching regulator to input $V_{second\ source}$ and to provide $V_1$.

10. The system of claim 1, wherein the first source first voltage regulator comprises a first switching regulator to input $V_{first\ source}$ and to provide $V_1$ responsive to $V_{first\ source}>V_1$.

11. The system of claim 10, wherein the first source second voltage regulator comprises a second switching regulator to, responsive to $V_{first\ source}>V_2$, input $V_{first\ source}$ and to provide $V_2$.

12. A method comprising:
    receiving, by control circuitry, an indication of a first source voltage $V_{first\ source}$ of a first source;
    selecting, by the control circuitry, a first source first voltage regulator to input $V_{first\ source}$ and supply a first voltage ($V_1$) responsive to $V_{first\ source}>V_1$, and selecting by the controller responsive to $V_{first\ source}\leq V_1$ a second source first voltage regulator to input from a second source a voltage $V_{second\ source}>V_1$ wherein $V_{second\ source}$ is substantially constant, and to supply $V_1$ independent of the first source first voltage regulator; and
    selecting, by the control circuitry, a first source second voltage regulator that is to input $V_{first\ source}$ and supply a second voltage ($V_2$) responsive to $V_{first\ source}>V_2$, wherein $V_2>V_1$ and selecting by the control circuitry responsive to $V_{first\ source}\leq V_2$ a second source second voltage regulator that is to input $V_{second\ source}$ and is to supply $V_2$ independent of the first source first voltage regulator and of the first source second voltage regulator, wherein $V_{second\ source}>V_2$.

13. The method of claim 12, wherein the first source comprises a rechargeable source, further comprising responsive to $V_{first\ source}<V_1$ determining to charge the first source.

14. The method of claim 12, further comprising responsive $V_{first\ source}$ being greater than an $N^{th}$ voltage ($V_N$), wherein $V_N>V_2$, selecting by the control circuitry a first source $N^{th}$ voltage regulator that is to input $V_{first\ source}$ and is to supply $V_N$, and responsive to $V_{first\ source}<V_N$ selecting a second source Nth voltage regulator to input $V_{second\ source}$ and to supply $V_N$ independent of the first source first voltage regulator, the first source second voltage regulator, and the first source $N^{th}$ voltage regulator, wherein $V_{second\ source}>V_N$.

15. The method of claim 12, wherein the second source first voltage regulator comprises a linear voltage regulator.

16. The method of claim 12, wherein the first source first voltage regulator comprises a switching regulator.

17. A system comprising:
    a first source voltage regulator module that includes a first source first voltage regulator to input a first source voltage $V_{first\ source}$ from a first source, and to supply a first output voltage ($V_1$) responsive to selection of the first source first voltage regulator by a controller, and further includes a first source second voltage regulator to input $V_{first\ source}$ and to supply a second output voltage ($V_2$) responsive to selection of the first source second voltage regulator by the controller, wherein $V_2>V_1$;
    a second source voltage regulator module that includes a second source first voltage regulator to input a second source voltage $V_{second\ source}$ that is substantially constant from a second source that is distinct from the first source and wherein $V_{second\ source}>V_1$ and $V_{second\ source}>V_2$, and responsive to selection of the second source first voltage regulator by the controller, to supply the first output voltage $V_1$ independent of the first source first voltage regulator and independent of the first source second voltage regulator, and a second source second voltage regulator to input $V_{second\ source}$ and responsive to selection of the second source second voltage regulator by the controller to supply $V_2$ independent of the first source first voltage regulator and independent of the first source second voltage regulator; and the controller to monitor $V_{first\ source}$ and to select the first source first voltage regulator to supply $V_1$ responsive to $V_{first\ source} > V_1$ otherwise to select the second source first voltage regulator to supply $V_1$, the controller further to select the first source second voltage regulator to supply $V_2$ responsive to $V_{first\ source} > V_2$ otherwise to select the second source second voltage regulator to supply $V_2$.

18. The system of claim 17, wherein the first source first voltage regulator includes a first switching regulator to supply $V_1$ responsive to selection by the controller of the first source first voltage regulator.

19. The system of claim 17, wherein the second source first voltage regulator includes a first linear regulator to supply $V_1$ responsive to selection by the controller of the second source first voltage regulator.

20. The system of claim 17, wherein the first source voltage regulator module includes a first source $N^{th}$ voltage regulator and the second source voltage regulator module includes a second source $N^{th}$ voltage regulator, wherein $N>2$ and $V_N$ is an $N^{th}$ output voltage, wherein responsive to $V_{first\ source} \leq V_N$ the controller is to select the second source $N^{th}$ voltage regulator to input $V_{second\ source}$ and to supply $V_N$, and responsive to $V_{first\ source} > V_N$ the controller is to select the first source $N^{th}$ voltage regulator to input $V_{first\ source}$ and to supply $V_N$.

* * * * *